United States Patent Office 3,671,281
Patented June 20, 1972

---

3,671,281
PYRAZOLONE RED PIGMENT AND PROCESS THEREFOR
Nagib A. Doss, Loudonville, N.Y., assignor to GAF Corporation, New York, N.Y.
No Drawing. Filed Sept. 16, 1970, Ser. No. 72,844
Int. Cl. C08h 17/14
U.S. Cl. 106—288 Q                    5 Claims

---

ABSTRACT OF THE DISCLOSURE

An improved red pigment is obtained by heating a commercially available pigment of the formula:

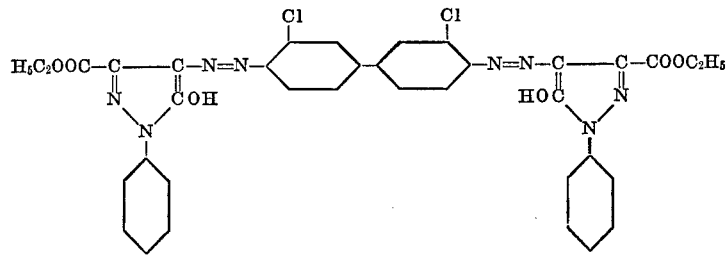

in an aromatic water-insoluble liquid boiling in a range of 80° to 250° C. for a period of about 0.75 to 12 hours and then stripipng the liquid from the solid. The resultant pigment is bluer, brighter, stronger, and both more bleed resistant and thermally stable than the original pigment starting material. The improved pigment thus obtained is useful in rubber, plastics, printing inks, lacquers, paint emulsion and textile printing.

---

This invention relates to a thermally stable, bright, blue shade, tinctorially strong form of an azo dye obtained by coupling tetra-azotized 3,3'-dichlorobenzidene with two moles of carboethoxy-pyrazolone. It relates further to a simplified process by which the improved material is obtained.

The dyestuff with which the present invention is concerned is widely manufactured and used in the rubber, plastics, printing, coating and textile fields. It is available under the name Vulcan Fast Red BA, is listed in the new and old Color Indexes as C.I. 21120 and C.I. Pigment Red 38, respectively and has the Formula I:

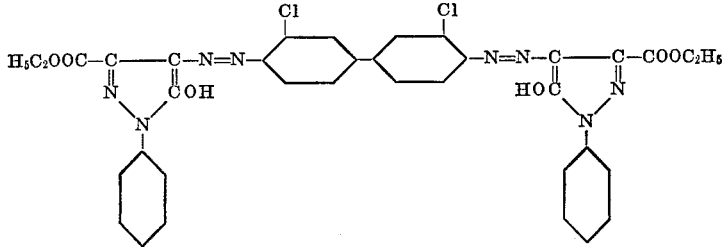

(I)

It is presently produced by forming the tetra-azo compound of 3,3'-dichlorobenzidene and then coupling it to 2 moles of carboethoxy-pyrazolone using a slight excess of the latter in the coupling mixture. In such reactions conversion in the diazotization and coupling steps may not be complete so that the reaction product contains as impurities, starting material, decomposed diazo and the monocoupled product as well as products of decomposition. These impurities can be occluded in the dyestuff crystals thereby causing loss of tinctorial strength, brightness, blueness nad heat stability. Normally, after the diazotization and coupling steps the product is isolated by washing with water until the water is neutral, large amounts of water being normally used in this procedure.

It has been found that the resultant dye, though useful for many commercial applications, is not sufficiently upgraded to be used in applications requiring a bright bluish red colored dyestuff having high levels of bleed resistance and thermal stability.

It is accordingly an object of the present invention to provide a dyestuff of the foregoing formula having improved properties and to provide the process by which the improved dyestuff can be prepared. Other objects of the present invention will be apparent from the ensuing description thereof.

In accordance with this invention it has been discovered that by heating the Vulcan Fast Red BA dyestuff in a solvent system for a period of 0.5 to 12 hours, and then stripping the solvent, a dyestuff is obtained which has improved shade characteristics, is tinctorially stronger and has greater heat stability. While it is not definitely established, it is believed that the improvement resulting from a process of the present invention is due to the formation of larger or more perfect crystallites or to the conversion of the materials to a new crystal form.

In carrying out the process of this invention Vulcan Fast Red BA is slurried with a solvent and the slurry is then heated for a period of time following which the solvent is stripped from the pigment and the pigment is dried. In practice it has been found beneficial after heating the pigment slurry, to combine water with the slurry, then separate as by filtering, or by steam distilling the solvent and then filtering. The remaining pigment is usually washed with water on the filter press and then dried in any known manner as by blowing dry or vacuuming dry and/or drying in ovens.

The solvents which are used in the process of this invention are aromatic water immiscible liquids which are liquid at or near room temperature and have high boiling points that is, up to about 250° C. The solvents are exemplified by benzene, chlorobenzene, bromobenzene, dichlorobenzene, nitrobenzene, aniline, toluidine, xylidine, chloroaniline, pyridine, picoline, chloronitrobenzene, dibromobenzene and bromoaniline. The term "solvent" as used in this application is not limted to liquids which dissolve the starting pigment material or the pigment product involved in the process of this application. Rather the term is used to cover liquid materials which have widely been used as solvents, with which the starting pigment is admixed to form a pigment slurry containing dissolved or suspended impurities from which the suspended pigment can be separated and thereafter isolated as described herein.

In carrying out the process of the present invention the pigment starting material is slurried in solvent in amounts ranging from 1 part of pigment to 5–20 parts of solvent, and preferably about 10–12 parts of solvent. The slurry is then heated until periodic sampling shows that the pigment material has been improved in heat stability, bleed resistance and tinctorial strength. The length of the heating period and the temperature to which the slurry is heated are interdependent and also dependent upon the specific solvent. To determine treating conditions for each system is a simple matter of periodically sampling the material to determine whether it has acquired the required degree of bleed resistance, thermal stability and tinctorial strength. These determinations can be made by the following procedures:

Heat stability of the treated pigment can be determined by incorporating the pigment into uncured rubber by conventional milling means and then subjecting the pigmented rubber to curing conditions, e.g. a curing temperature of 250°–350° F. for 10 to 15 minutes. The heat stability is determined by noting whether the pigment undergoes a shade or strength change as a result of the heat treatment.

Bleed resistance is determined in a simple manner by admixing a small amount of pigment with linseed oil with the aid of a spatula until the pigment is well dispersed throughout the liquid. The liquid containing suspended pigment is spotted on filter paper and the paper is observed for the formation of a color ring. If the pigment has low bleed resistance there is practically no noticeable color in the liquid surrounding the area at which the filter was spotted.

If it is desired, the pigment can be tested for tinctorial strength in the usual manner by forming a coating composition, preparing a draw-down on glass and comparing this to a draw-down made with untreated pigment as the standard material.

In general, the temperature to which the Vulcan Fast Red BA is heated, ranges from about 100° to 180° C. but the time of heating ranges from about 0.75 to 12 hours. The period and temperature of heating are important since, if the pigment is not heated for a sufficiently long time or at a sufficiently high temperature the desired improvements will not be effected; whereas if heating is for too long a period at high temperatures, the pigment will be adversely effected rather than improved.

After the pigment has been heated for a sufficiently long time as determined above, the solvent is stripped from the pigment in any known way. For example, the slurry can be cooled, filtered, washed and dried, or the solvent can be steam distilled off, the pigment then being washed with water, and dried in any manner as by vacuum- or blow-drying or else by heating in an oven.

The product which is obtained by the foregoing process is distinctly bluer and brighter than the original untreated pigment. It has about 30% greater tinctorial strength than the untreated pigment, and also greater stability at higher temperatures. It is accordingly more useful for coloring materials which are to be subjected to high temperature such as in rubber processing where the temperature may go as high as 300° F. It also has practically no bleed in any solvents such as linseed oil, lacquer, dioctylphthalate and the like.

The following examples are presented to further illustrate the present invention.

EXAMPLE 1

To 200 parts of aniline, heated to 80–85° C., are added 40 parts of Vulcan Fast Red BA (C.I. Pigment Red 38). The charge is heated gradually to 110° C., and held at that temperature for one hour with fast agitation. To this is added 200 parts of water at 80° C. The aniline is steam distilled off. The charge is then filtered, washed with warm water and dried yielding the improved Pyrazolone Red pigment of this invention.

EXAMPLE 2

Example 1 is repeated except that after addition of the 200 parts of water, the slurry is cooled to about room temperature and filtered, washed with warm water and dried. A product similar to the product of Example 1 is obtained.

EXAMPLES 3–10

Example 2 is repeated employing the following solvents:

| Example | Solvent | Temperature (° C.) | Time (hrs.) |
|---|---|---|---|
| 3 | Chlorobenzene | 130–135 | 5 |
| 4 | o-Dichlorobenzene | 160 | 6 |
| 5 | N,N-dimethylaniline | 110 | 1 |
| 6 | N-methylaniline | 113 | 1 |
| 7 | N,N-diethylaniline | 115 | 1 |
| 8 | N-ethylaniline | 115 | 1 |
| 9 | 2,5-dichloroaniline | 110 | 1 |
| 10 | Pyridine | 110–120 | 1 |

EXAMPLE 11

40 parts of Color Index Pigment Red 38 is combined with 200 parts of N-methylpyrrolidone and 200 parts of water. The charge is heated in an autoclave at 140° C. for 24 hours, after which it is filtered, washed and dried, giving a product substantially identical to that produced in Example 1.

EXAMPLES 12–16

Example 11 is repeated employing, instead of the N-methylpyrrolidone, the following solvents:

| Example | Solvent | Temperature (° C.) | Time (hrs.) |
|---|---|---|---|
| 12 | m-Toluidine | 110–115 | 6 |
| 13 | p-Xylidene | 110–115 | 8 |
| 14 | Bromobenzene | 140 | 12 |
| 15 | Nitrobenzene | 140 | 6 |
| 16 | Pyridine | 130 | 4–6 |

EXAMPLE 17

This example illustrates the advantages of the Pyrazolone Red pigment of this invention made according to the method of Example 1 over a product which has not been subjected to the heat treatment herein described, i.e. C.I. Pigment Red 38. The dye was produced by tetraazotizing 3,3'-dichlorodibenzidene and then coupling it to two moles of carboethoxypyrazolone, the equivalent amount or a slight excess of the latter being used. The product is washed with water until it is neutral, large amounts of water being required to reach the point of neutrality.

(A) Heat stability test

Samples of rubber were milled with 0.75% pigment in a rubber mill at a milling temperature of 35° C. Part of each milled sample was cured at 300° F. for 12 minutes and the color of the cured sample was compared against the uncured rubber sample containing the same pigment. There is practically no change in the shade or strength of the cured rubber sample containing heat treated pigment of the present invention as against the distinct shade change and loss of strength in the rubber sample containing untreated pigment.

(B) Reduction (or tint) test

To produce the masstone 0.5 g. of pigment is mixed with 0.9 g. of varnish and the mixture is milled on a Hoover Muller 2×50 revolutions (150 lb. wt.). The tint is produced by mixing 0.05 g. of masstone and 5.0 g. of bleach white ink and milling on a Hoover Muller 2×25 revolutions (150 lb. wt.). A draw-down is made on glass and the shades of the respective samples are noted. The draw-down prepared above with pigment treated in accordance with the present invention resulted in a distinctly bluer and brighter shade, 79/100 in strength as compared with the draw-down prepared with untreated pigment.

(C) Bleed resistance 0.1 g. of pigment is mixed with 6 drops of linseed oil with the aid of a spatula. The mixture is spotted on filter paper and the color ring is observed. There is practically no bleed into the ring in the case of the linseed oil spot of the treated pigment of the present invention as compared with a noticeable reddish bleed in the case of the linseed oil mixture prepared from untreated pigment.

peaks, especially in the 9.95 A., the 4.98 A., the 3.75 A. and the 3.35 A. range, indicates a definite physical change during the heat treating step. The appearance of the new reflections on the pattern of the new product are due to the production of more perfect, large crystallites, or to the production of a new crystal form and/or to the removal of foreign materials and impurities.

What is claimed is:

1. A process for the preparation of an improved pigment of the formula

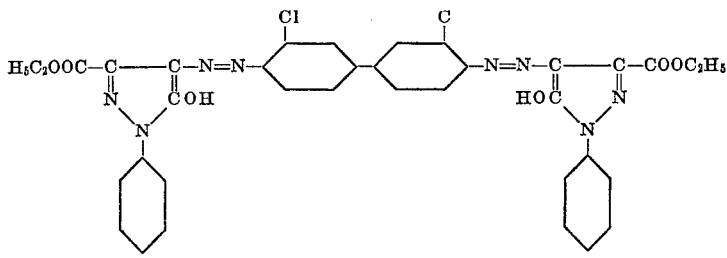

EXAMPLE 18

In order to show the difference between the treated pigment of the present invention and the untreated C.I. Pigment Red 38, X-ray diffraction patterns of each were prepared by subjecting crystals of each to $CuK_\alpha$ radiation at 40 kv. and 35 ma. and the diffracted rays were measured both as to intensity and angle with the following results:

SUMMARY OF X-RAY REFLECTION OF SAMPLES

| Pyrazolone pigment product | | Vulcan Fast Red BA | |
|---|---|---|---|
| Interplanar spacings, A. | Intensity (percent) | Interplanar spacings, A. | Intensity (percent) |
| 9.95 | 53 | 10.00 | 82 |
| 8.84 | 7 | | |
| 6.60 | 5 | | |
| 6.14 | 3 | | |
| 5.71 | 3 | | |
| 5.30 | 9 | | |
| 4.98 | 28 | 5.0 | [1] 12 |
| 4.60 | 3 | | |
| 3.75 | 27 | 3.78 | [1] 8 |
| 3.35 | (100) | 3.36 | (100) |
| 2.98 | 5 | | |

[1] Very broad, diffuse.

The fact that the Pyrazolone Red pigment of the invention shows a much greater reflectance, as well defined which comprises slurrying C.I. Pigment Red 38 in a water immiscible liquid which boils in a range of 80° to 250° C., heating the resultant slurry for a period of 0.75 to 12 hours at a temperature in the range of 100° C. to 180° C., separating the solids from the liquid, washing the separated solids with water and recovering the improved pyrazolone red pigment.

2. The process of claim 1 wherein the liquid is an aromatic solvent which is liquid at room temperature.

3. The process of claim 1 wherein the liquid is aniline.

4. The product produced by the process of claim 1.

5. A process as defined in claim 1 employing a weight ratio of one part of said Pigment Red 38 per 5 to 20 parts of said water-immiscible liquid.

References Cited

UNITED STATES PATENTS 3,169,955  2/1965  Seibert et al. _____ 260—176

TOBIAS E. LEVOW, Primary Examiner

J. V. HOWARD, Assistant Examiner

U.S. Cl. X.R.

106—308 Q, 308 N, 309